(12) United States Patent
O'Hare et al.

(10) Patent No.: US 7,088,703 B2
(45) Date of Patent: *Aug. 8, 2006

(54) MULTIPATH MULTIHOP REMOTE DATA FACILITY

(75) Inventors: Jeremy J. O'Hare, Hopkinton, MA (US); Mark J. Halstead, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 859 days.

This patent is subject to a terminal disclaimer.

(21) Appl. No.: 09/814,642

(22) Filed: Mar. 22, 2001

(65) Prior Publication Data

US 2001/0050915 A1    Dec. 13, 2001

Related U.S. Application Data

(63) Continuation-in-part of application No. 09/591,827, filed on Jun. 12, 2000, now Pat. No. 6,697,367.

(51) Int. Cl.
*H04L 12/28* (2006.01)

(52) U.S. Cl. .................................... 370/351; 370/400
(58) Field of Classification Search ............ 379/221.01, 379/230–240; 370/351, 352, 363, 395.71, 370/395.72
See application file for complete search history.

(56) References Cited

U.S. PATENT DOCUMENTS

| | | | | |
|---|---|---|---|---|
| 4,748,658 A | * | 5/1988 | Gopal et al. | 379/221.01 |
| 5,579,480 A | * | 11/1996 | Cidon et al. | 709/243 |
| 5,751,800 A | * | 5/1998 | Ardon | 379/134 |
| 5,941,972 A | | 8/1999 | Hoese et al. | |
| 5,949,760 A | * | 9/1999 | Stevens et al. | 370/254 |
| 6,400,681 B1 | * | 6/2002 | Bertin et al. | 370/218 |

FOREIGN PATENT DOCUMENTS

| | | |
|---|---|---|
| EP | 0397370 A2 | 5/1990 |
| EP | 0757318 A2 | 6/1996 |
| EP | 0936547 A2 | 2/1999 |
| GB | 2351375 A | 12/2000 |

OTHER PUBLICATIONS

Multihop System Calls—Pending U.S. Appl. No. 09/591,827, filed Jun. 6, 2000.

* cited by examiner

*Primary Examiner*—Chau Nguyen
*Assistant Examiner*—Christopher Grey
(74) *Attorney, Agent, or Firm*—Muirhead & Saturnelli, LLC

(57) ABSTRACT

A computer system may include one or more hosts and a plurality of data storage devices for providing multihop system calls. The data storage devices are interconnected and also connected to the one or more hosts. Each data storage device classifies a data operation as a system call, a remote system call, or a multihop system call. Also described is a multipath multihop system call in which one or more communication paths may be selected using predetermined and/or dynamic communication path selection techniques. The number of communication paths determined may be in accordance with parameters that are included in a multipath multihop system call, tunable system parameters, or a combination of the foregoing.

89 Claims, 10 Drawing Sheets

MULTIPATH MULTIHOP REMOTE DATA FACILITY

CROSS REFERENCE TO RELATED APPLICATIONS

This application is a continuation-in-part of U.S. patent application Ser. No. 09/591,827, filed on Jun. 12, 2000 now U.S. Pat. No. 6,697,367 entitled "MULTIHOP SYSTEM CALLS".

BACKGROUND OF THE INVENTION

1. Technical Field

This application relates generally to computer systems, and more particularly to specifying communication paths in a computer system.

2. Description of Related Art

Computer systems may include different resources that may be used by one or more processors. Resources and processors in a computer system may be interconnected by one or more communication connections. These resources may include, for example, data storage devices such as the Symmetrix™ family of data storage systems manufactured by EMC Corporation. These data storage systems may be coupled to one or more processors and provide storage services to each processor. An example data storage system may include one or more data storage devices, such as those of the Symmetrix™ family, that are connected together and may be used to provide common data storage for one or more processors in a computer system.

A processor may perform a variety of data processing tasks and operations using the data storage system. For example, a processor may perform basic system I/O operations, such as data read and write operations and also administrative tasks, such as data backup and mirroring operations. In performing any one of the foregoing operations, the processor may use one or more system calls in which the processor making the system call instructs a data storage device to perform a particular operation.

In some data storage device arrangements, a first data storage device may be connected to a second data storage device and a processor may only be able to send commands to the second data storage device indirectly using the first data storage device. In other words, the processor only has a direct connection to the first data storage device, and an indirect connection to the second data storage device. If the processor wishes to instruct the second data storage device to perform a data operation, the processor may use a remote system call using the first data storage device. The processor may issue a remote procedure call to the first data storage device which instructs the second data storage device to perform a data operation, for example.

A problem may exist in a data storage device arrangement that includes yet another level of indirect data storage devices. For example, in addition to the previously described data storage device arrangement of a first and a second data storage devices, a third data storage device may be connected to the second data storage device. In some applications, a processor may need to instruct the third data storage device to perform data operations. If the processor has a direct connection only to the first data storage device, remote system calls may be used to instruct the second data storage device to perform data operations, and system calls may be used to instruct the first data storage device to perform data operations. However, in the foregoing arrangement for the processor to instruct the third data storage device to perform a data operation may require such instructions pass through an indirect connection of the first and second data storage devices. There is no way for the processor to so instruct the third data storage device using system calls or remote procedure calls due to the additional storage device layering in the data storage device arrangement. Generally, similar problems may exist in data storage device arrangements that also include more than the foregoing three levels of indirect data storage it device access from a processor.

Two data storage devices, or a processor and a data storage device, may also communicate using one or more connections. For example a first and second data storage device may communicate over Storage Area Network (SAN), and a processor may communicate with a data storage device over a Local Area Network (LAN). Thus, a network may be used to facilitate communications between devices or devices and processors where the level of indirection may create a problem using system calls or remote procedure calls to facilitate data transfers. However, there is a connection between the two devices or the processor and a device.

A communication path between two data storage devices, or a processor and a data storage device, may be determined, for example, using a network, direct, or indirect connections and remote procedure calls. This communication path may be used in performing data transfers between the two particular data storage devices, a processor and a data storage device, and the like. However, a problem may exist in the event of component or connection failure included in a communication path in addition to the level of indirection of the data storage device accessed, for example, from a processor.

Thus, it may be advantageous to provide a technique for the processor and/or data storage device to perform data operations in data storage arrangements that include three or more levels of indirect data storage device access, and additionally provide for an alternate and dynamic selection and specification of a communication path, for example, in the event of a component or connection failure.

SUMMARY OF THE INVENTION

In accordance with one aspect of the invention is a method executed on a first data storage device for processing a multipath multihop system call. It is determined if a data operation request is a multipath multihop system call. A communication path between the first data storage device and a target data storage device is determined. A first communication connection is determined between the first data storage device and a second data storage device included in the communication path. The data operation request is sent to the second data storage device.

In accordance with another aspect of the invention is a method executed in a computer system for processing a data operation request from a host computer system to a target data storage device. A communication path is determined from the host computer system to the target data storage device. A data operation request is sent to a first data storage device connected to the host computer system by one a local area network or a storage area network. The data operation request is forwarded to an intermediate data storage device included in the communication path over a communication connection between the first data storage device and the intermediate data storage device.

In accordance with yet another aspect of the invention is a computer system. A host initiates a data operation request. At least three data storage devices are included in which the data operation request is directed to at least one of the three data storage devices. A communication exists between the host and each of the at least three data storage devices. Each of the communication connections includes at least one of storage area network or a local area network. Each of the at least three data storage devices includes machine executable code for: receiving and interpreting the data operation request over the communication connection that is one of a local area network or a storage area network, determining if the data operation is a multipath multihop system call, and forwarding, in response to determining that the data operation is a multipath multihop system call, a second portion of the data associated with the data operation request to an other of the at least three data storage devices.

In accordance with yet another aspect of the invention is a data storage device that includes machine executable code for determining whether a data operation request is a multipath multihop system call, determining a communication path between the data storage device and a target data storage device, and determining a first communication connection between the data storage device and a second data storage device included in the communication path. Also included is machine executable code for sending the data operation request to the second data storage device.

In accordance with yet another aspect of the invention is a computer readable storage medium for use in processing a data operation request from a host computer system to a target data storage device. Included is machine executable code for determining a communication path from the host computer system to the target data storage device, sending a data operation request to a first data storage device connected to the host computer system by one of a local area network or a storage area network, and forwarding said data operation request to an intermediate data storage device included in the communication path over a communication connection between the first data storage device and the intermediate data storage device.

In accordance with another aspect of the invention is a method executed by a data storage entity for routing a communication. A type associated with the communication is determined. A communication connection between the data storage device and a connecting data storage entity is determined. The communication is sent to the connecting data storage entity using the communication connection.

In accordance with another aspect of the invention is a computer program product for routing a communication by a data storage entity. Included is machine executable code for determining a type associated with the communication, determining a communication connection between the data storage device and a connected data storage entity, and sending the communication to the connecting data storage entity using the communication connection.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF VARIOUS EMBODIMENTS

Described in U.S. Pat. Ser. No. 09/064,588, filed on Apr. 22, 1998 (pending), entitled "UNIFIED PROGRAMMING INTERFACE", herein incorporated by reference, is a technique of providing a unified interface to a data storage system allowing different host processors to access the data storage system without requiring the host processor to have knowledge as to the memory configuration, such as where internal control data structures are physically located.

Figure 1:
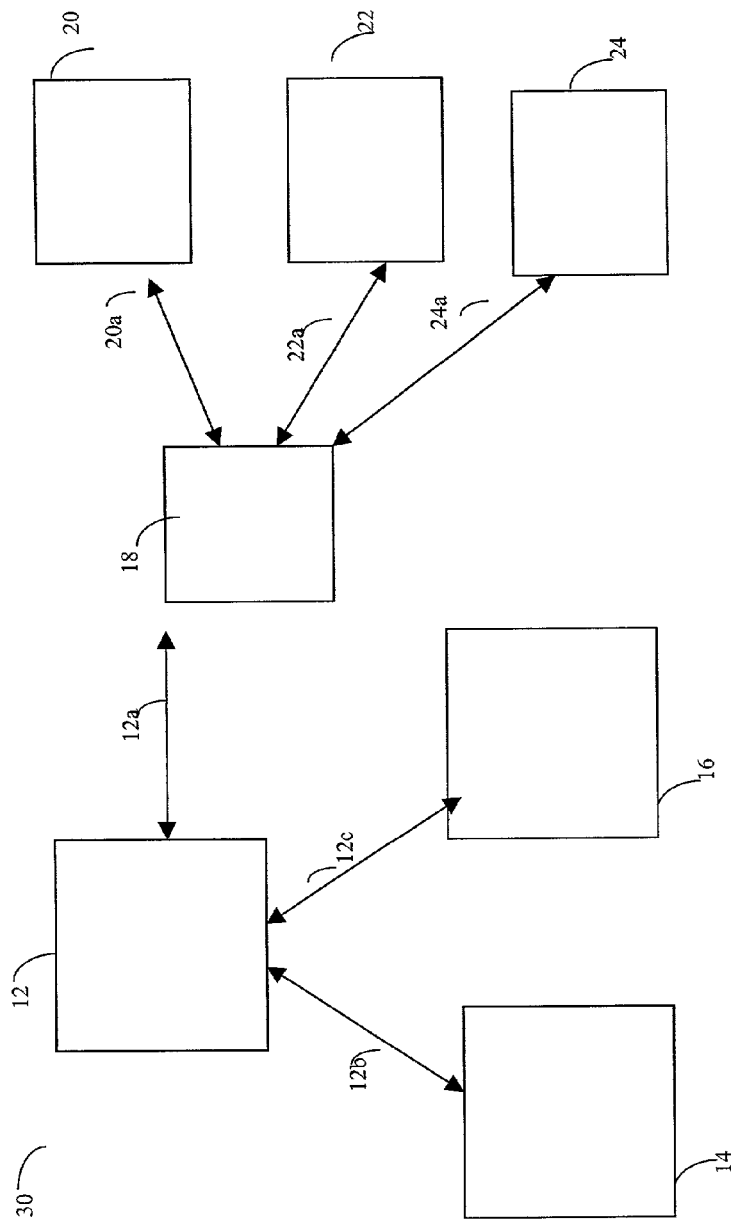
FIG. 1 is an example of an embodiment of a computer system according to the present invention.

Referring now to FIG. 1, shown is an example of an embodiment of a computer system that employs the multihop technique described herein. Included in the computer system 30 are N host computers, 20, 22, and 24 which may be, for example, host computers included in the computer system 30. The host computers 20, 22, and 24 may all be located at the same site or may be located in different areas. Also included in the computer system 30 are multiple data storage devices 12, 14, 16, and 18. Each of the data storage devices 12, 14, 16, and 18 may be any one of a variety of data storage devices, such as products provided by EMC Corporation of Hopkinton, Mass. Each of the N host computers 20, 22, and 24 may be, for example, any one of a variety of commercially available single or multi-processor computers including, for example, a personal computer or mainframe computer, such as an IBM mainframe or SUN Sparcstation. Communication is provided using any one of a variety of communication protocols, such as SCSI, ESCON, or Fiber Channel, through connections 12a, 12b, 12c, 20a, 22a, and 24a. Note some or all of connections 12a, 12b, 12c, 20a, 22a, 24a, may pass through other communication devices such as a Connectrix or any other switching equipment that may exist on the way, including a phone line, a repeater, a multiplexer or even a satellite. However, the other communication devices just act as blind transport media for purposes of the discussion herein.

Different types of data operations may be performed in accordance with different types of administrative tasks. In the embodiment of FIG. 1, any one of the host computers 20, 22 or 24 may issue a system call to the data storage device 18 to perform a data operation on the data storage device 18. Additionally, an application, for example, executing on a host computer 20 performing a backup, mirroring, or other administrative operation, may need to have one or more of the data storage devices 12, 14 and/or 16 perform a data operation. The plurality of interconnected storage devices 12, 14, 16, and 18 may be accessed by any one of the host computers 20, 22, and 24 indirectly through the data storage device 18. For example, the host computer 20 may issue a system call to the data storage device 18 to perform a read operation, a write operation or other type of data operation. A system call may be described as a call directed to a data storage device to perform a data operation that is a distance of one level from the host computer initiating the system call. Note that in some embodiments, a different mechanism, called an "in-line call" may be used to perform functionality similar to that of system calls. For purposes of the discussion herein, the functionality added to system calls may be similarly applied to in-line calls.

Additionally, one of the host computers, such as the computer 20, may instruct data storage device 12 to perform a data operation indirectly through data storage device 18 by using a remote system call. With a remote system call, the host computer may issue a request to the data storage device 18 which, in turn, subsequently issues a remote system call using the connection 12a to the data storage device 12 to perform a particular data operation, such to read or write data. A remote system call is a call directed to a data storage device to perform a data operation that is a distance of two levels from the host computer initiating the system call.

In yet another example of performing a data operation, one of the host computers, such as the computer 20, may desire to issue a command to either the device 14 or the device 16. The host computer 20 may indirectly issue a command to a data storage device, such as the device 14, using the data storage devices 12 and 18 as a "pass through" or indirect connection to the data storage device 14 or the device 16. This may be done by the host computer 20 issuing a multihop system call. Generally, a multihop system call may be described as a call directed to a data storage device to perform a data operation that is a distance of three or more levels from the host computer initiating the call. Multihop system calls are described in more detail elsewhere herein.

It should be noted that in the illustrated embodiment, the connections between any two data storage devices, such as the device 12 and the device 18 connected via the connection 12a, may be identified by one or more connection identifiers rather than a machine identifier. In other words, when a host computer 20 issues a command directed for the target device 12, the connection between each of the devices 12, 18 may be identified by a connection identifier rather than identifying a target data storage device, such as the device 12, in the call. This is described in more detail elsewhere herein. Additionally, it may be generalized in the illustrated embodiment where each of the data storage devices 12, 14, 16, and 18 have interconnections defined between them. A connection between any two data storage devices, such as the connection 12a, or a connection from a computer to a data storage device, such as the connection 20a, may be identified through a connection identifier rather than using machine identifiers associated with a data storage device or computer. In other words, when a host computer, such as 20, directs a data storage device, such as the device 14, to perform a data operation, the host computer 20 may use one or more connection identifiers to specify a path from the host computer 20 to the target data device 14. The host computer 20 may identify a first connection identifier from host computer 20 to data storage device 18, a second connection identifier between data storage devices 18 and 12, and a third connection identifier between data storage devices 12 and 14. These connection identifiers may be specified, for example, in a multihop system call. Alternatively, a multihop system call may specify the systems used for the multihop path or, in some embodiments, use only an identifier for the end system or the end connection. However, specifying all of the intermediate connections or systems allows each system handling the call to have only local knowledge (i.e., to not have to be aware of the entire system and the topology thereof).

Figure 2:
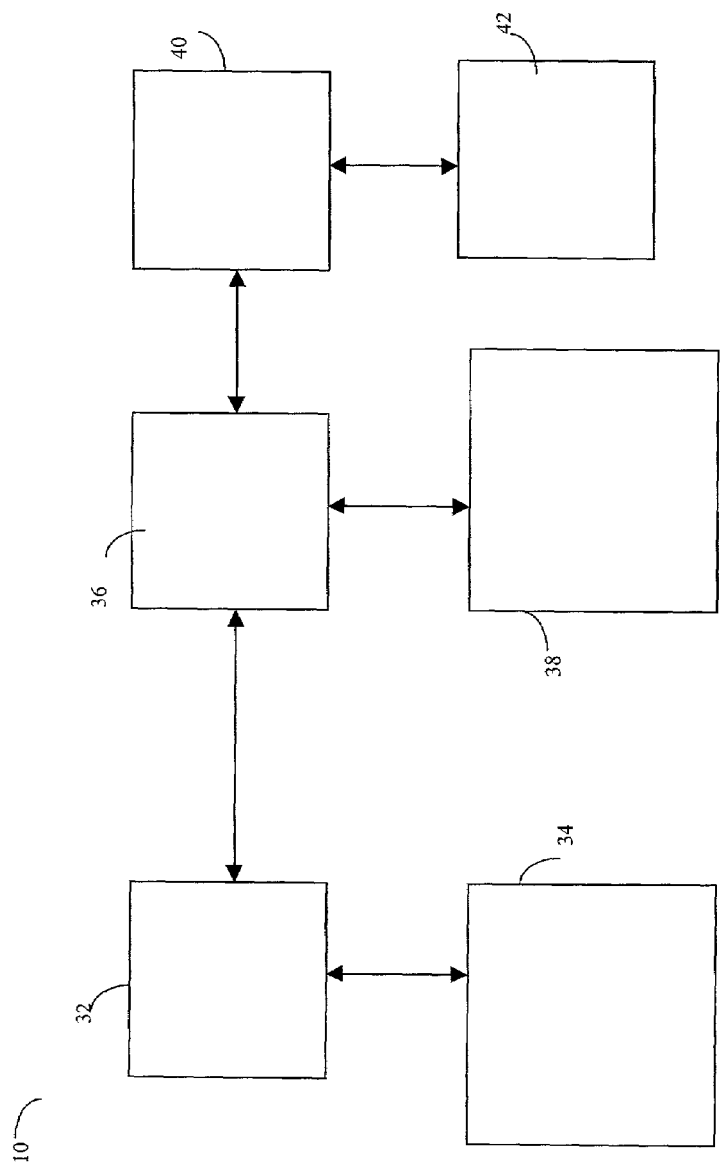
FIG. 2 is an example of another embodiment of computer system according to the present invention.

Referring now to FIG. 2, shown is an example of another embodiment of a computer system that uses the multihop technique disclosed herein. The computer system 10 includes two host computers 34, 38 and multiple storage devices 32, 36, 40, and 42 that are interconnected. Additionally, there is a direct connection between the host 34 and the data storage device 32 as well a direct connection between the host 38 and the data storage device 36. It should be noted that each of the data storage devices 32, 36, 40, and 42 are similar to the data storage devices described in conjunction with FIG. 1 and elsewhere herein. Similarly, each of the host 34 and 38 are similar to hosts 20, 22, and 24 also described in connection with FIG. 1 and described elsewhere herein. FIG. 2 shows an alternate embodiment and arrangement of data storage devices and host computers, for example, as may be included in an arrangement in which the host 38 and device 36 mirror the host 34 and the data included on the data storage device 32. In other words, the data storage device 36 may serve as a shadow of the device 32. In this particular arrangement, the host 38 may serve as an alternate system, for example, when host 34 experiences operating problems and is removed from the network. For example, if the host 34 and/or the device 32 experience a power failure or other type of system failure, the host 38 and the data stored on the device 36 may automatically come on line to replace and function as an alternate for the host 34 and the device 32. In order to allow the host 38 and device 36 to function as just described, the host 34 may include software that, for example, performs remote backup and copy operations to the devices 36 and 40 from the device 32. In other words, the host 34 may issue commands to the data storage device 32 to copy data to devices 36 and 40. In this arrangement, the device 32 may serve as a backup device for 36. This may allow the system 38 and device 36 to operate in the computer system 10 replacing the system 34 and device 32, such as when there is a power failure or other system problems of device 32 and/or host 34. In an instance in which the host 38 and device 36 function to replace the host 34 and device 32, the host 38 and device 36 need to have a designated backup storage device, which in the illustrated embodiment is device 40. Thus, the system 34 issues instructions to store data on data storage device 40 as well as data storage device 36.

It should be noted that, in a manner similar to that described in conjunction with FIG. 1, the connections between each of the data storage devices 32, 36, and 40 are identified by a connection identifier rather than a machine identifier. This is also explained in more detail in paragraphs that follow.

Figure 3:
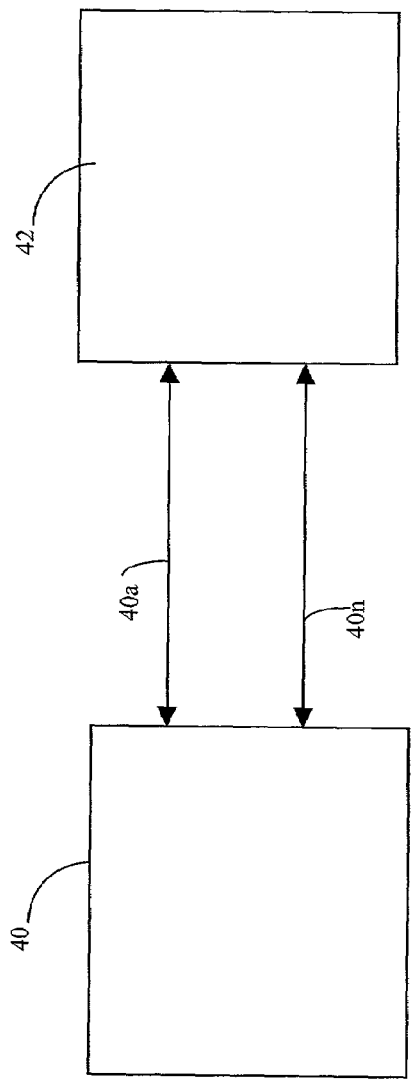
FIG. 3 illustrates an embodiment of the invention having connections between two data storage devices that may be included in the computer systems of FIGS. 1 and 2.

Referring now to FIG. 3, shown is an embodiment having different connections that may exist between any two storage devices interconnected in each of the foregoing arrangements. For example, the data storage devices 40 and 42 included in the computer system 10 of FIG. 2 are shown in more detail here as having any one of a variety of communication connections 40a–40n. Each of the connections 40a–40n may be uniquely identified by a connection identifier to specify a path, for example, for issuing a system call, a remote system call, or a multihop system call to a data storage device 42 directly or indirectly using, for example, the data storage device 40.

It should be noted that there may exist one or more connections between a host computer and a data storage device, or between any two storage devices. The number and type of each may vary in accordance with each implementation and uses. Also, a connection identifier specifying a particular connection between a first port of a first storage device and another port of a second storage device may be a number or other unique identifier enabling a message to be forwarded from one data storage device to another. In some embodiments, the connection identifier may be a number between one and sixteen, although other ranges of numbers are possible. For example, in one embodiment, the range of 0 . . . 15, inclusively, may be used. In another embodiment, alphabetic designation of A–K, inclusively, may be used. In yet another embodiment, the connection identifier may identify, for example, the next storage device such as the next Symmetrix™ data storage device rather than specify a particular communication channel.

In the foregoing computer system arrangements of data storage devices and host computer systems, software may be executed on each of the host systems connected to the storage devices to perform the particular data operations, such as those related to performing backup operations and the like. Software also may execute on each of the data storage devices in connection with performing different data operations to receive the different data operation commands from the different host systems. Such software is available, for example, from EMC Corporation of Hopkinton, Mass.

Figure 4:
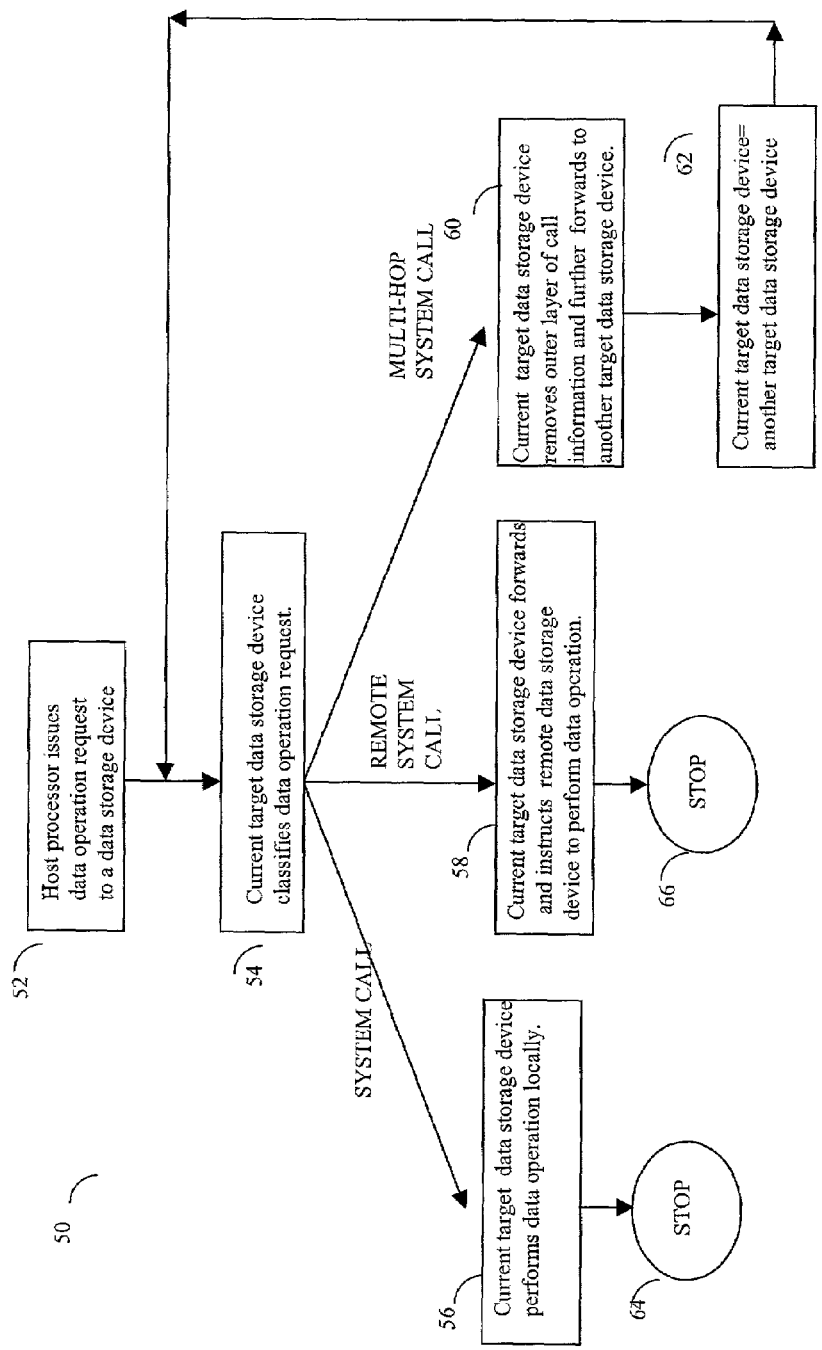
FIG. 4 is a flowchart of a method performed in a computer system according to the present invention for performing a data storage operation.

Referring now to FIG. 4, shown is a flowchart illustrating one embodiment for performing data operations, for example, in the computer system arrangements of FIG. 1 and FIG. 2. At a step 52, a host processor issues a data operation request to a data storage device. At a step 54, the current target data storage device that receives the request classifies the data operation request. In the illustrated embodiment, the data operation request may generally be classified as one of three categories: a system call, a remote system call, or a multihop system call. (Note that conventional I/O operating are not discussed here but, for purposes of this discussion, may be considered different from the data operation requests discussed in connection with FIG. 4). If the target data storage device classifies the data operation request as a system call, the current target data storage device performs the data operation locally. If the data operation request is classified as a remote system call with respect to the current target data storage device, the current target data storage device further forwards and instructs the remote data storage device to perform the data operation. In other words, the current target data storage device may be viewed as an intermediate storage device which further forwards and issues a data operation to yet another data storage device that performs the data operation.

If the data operation request is classified as a multihop system call, the current target data storage device removes the outer layer of call information (i.e., the information that caused the command to reach the current target) and further forwards the call information or data to a second target data storage device. Control proceeds to a step 62 where the second target data storage device now becomes the current target data storage device with respect to subsequent processing steps. Control then proceeds to the step 54 where the newly designated current target data storage device classifies the data operation request.

Generally, the multihop system call may employ the foregoing technique of embedding a remote system call that is applied to a data storage device that is three or more layers removed from the requesting host computer, i.e. more than a remote system call. As part of the interpretation process, the current target data storage device may remove an outer layer of data associated with a current call instance, and further forward the remaining data to a second target data storage device. This second target data storage device then performs the same process of removing an outer layer of data. The process of removing a layer of call information and further forwarding remaining data to another target data storage device may be performed until a remote system call or a system call is reached at the inner most layer of data.

It should be noted that an embodiment may optionally include, for example, as associated with step 60, not to remove information in processing a multihop system call, or any other type of call. Rather, the processing description for step 60 in another embodiment may just forward the call information without removing portions thereof. This may also be the case with one or more other processing steps, such as 56 and/or 58 of flowchart 50. This may be preferred, for example, in an embodiment to retain path information that may be used in traversing a return path as may be used in returning information. A determination of whether or not to remove portions of data from call information in connection with a multihop system call may vary in accordance with each embodiment. For example, it may be preferred to not remove portions of the call information in an embodiment that uses fixed packet sizes. It may be preferred in another embodiment having a large variable packet size to remove a portion of the call information prior to further forwarding to another target if the return path information is not needed and/or due to the overhead associated with passing a large data packet.

The steps of the flowchart 50 are a method of classifying a data operation request and the method steps may be performed by each of the data storage devices included in an arrangement. Each incoming data operation request may be classified in accordance with the level of the system call with respect to the level of data device which is the receiving target data storage device from an initiating host computer. If the level is one implying that the receiving data storage device is the actual target data storage device to perform the designated data operation, a system call may be issued from the host system to the target device. With the level of two, a remote system call may be used to further forward the data operation instruction to a second level of data storage device from the first data storage device. If the level is greater than two, a is multihop system call may be used in that the target data storage device to perform the data operation is three or more nodes removed from the issuing host processor.

Referring back to the computer system 10 of FIG. 2, for example, the host computer 34 may initiate a data operation request. Assume that the computer system diagram may be viewed as a graph of nodes in which each node is a computer system or a data storage device having edges that are the connections. A depth or level of one associated with the data operation request indicates a first data storage device 32 where a system call may be used to issue a data operation to be performed. With a depth of two, for example, if the host processor 34 issues a data operation request to be performed by a second storage data device 36, a remote system call may be used. With a depth of three, the host processor 34 may use a multihop system call, for example, to issue a data operation request to be performed by the third data storage device 40.

In one example, the data storage device 32 may execute the method steps included in the flowchart 50 in accordance with classifying the data operation request as a system call, a remote system call or a multihop remote system call, for example, as may be designated by an operation code in a particular field in which the data operation request. If the data storage device 32 classifies an incoming data operation request as a remote system call, the data storage device 32 may issue a remote system call to the data storage device 36 to perform the actual data operation. In the event that a multihop system call is detected, for example, by an operation code that may be included in the system call, the data storage device 32 may remove the outer layer of call information, such as a first level of connection identifier information which may indicate the second data storage device 36 as the device to which the remote system call is directed, and further forward remaining data to the storage device 36. In turn, the data storage device 36 now becomes the receiving or the current target data storage device and it proceeds to perform the processing steps 54, 56, 58, 60 and 62. Generally, any incoming system call that is classified as a multihop call by a data storage device performs the step of removing the outer layer of call information (step 60) and further forwarding the data that may be further encapsulated or embedded in the call to another target data storage device, for example, as may be specified by a current connection identifier (step 62). That target data storage device then proceeds to perform the classification of the embedded data. This process may be performed by each of the different target data storage devices in accordance with the connection identifier that may be included in a data operation request until either a system call or a remote system call has been classified by the current target data storage device. In some embodiments, the maximum number of hops is set to seven or eight in order to limit the maximum size of a multihop command.

Figure 5:
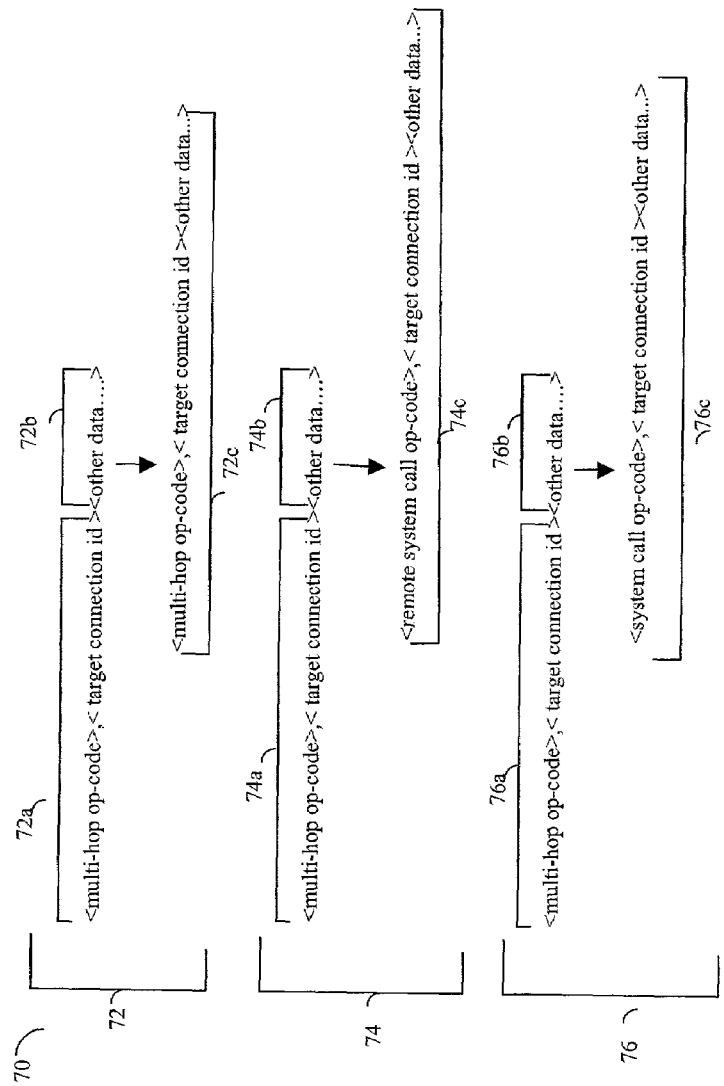
FIG. 5 is an example of how data included in a multihop system call may be interpreted by a target data storage device according to the present invention.

Referring now to FIG. 5, shown is an example of an embodiment of different interpretations of data that may be embedded in a multihop system call. An element 72 includes a message format having portions 72a and 72b. Taken together, the portions 72a and 72b may represent a format of a multihop system call. The portion 72a includes a multihop op-code and a target connection id which may be removed as in the processing step 60 by the current target data storage device. The target connection id included in the field 72a identifies a connection to yet another data storage device to which the other data portion 72b may be forwarded. The description 72c is a representation of how the receiving data storage device may interpret the data 72b while performing processing of step 54. Generally, a first data storage device may remove the portion 72a as part of the step 60, and then further forward the portion 72b to a second data storage device designated by the target connection id included in the field 72a. The other data 72b, when actually interpreted, for example, by the second data storage device, may be yet another multihop remote system call as indicated by field 72c. In other words, the other data 72b may be interpreted as the data which is actually included in the representation 72c.

Referring to element 74, shown is an example of another possible mapping of information included in a data operation request by a receiving target data storage device. In the processing of the step 60, a first data storage device may remove the portion 74a and further forward the portion 74b to a second target data storage device as specified by the target connection id included in the portion 74a. As an example, the data portion 74b may be interpreted by the second data storage device as represented in field 74c. In other words, the first data storage device forwards data to a second data storage device which further interprets the data it receives as a remote system call as represented in field 74c. Yet the third data element 76, includes a portion 76a and 76b similar to what is shown in elements 72 and 74. In the processing of step 60, a first data storage device may remove the portion 76a from the data received and further forward that data portion 76b to a second data storage device as designated by the target connection id included in field 76a. The second data storage device may then execute the processing of step 54, 56, 58, 60 and 62 and interpret the field 76b data as represented in a field 76c. In the illustrated example, the data which is passed to the second data storage device may be interpreted as a system call including operations, for example, which are performed in accordance with step 56.

It should be noted that an embodiment may also choose not to remove any one or more portions of the call information, for example, in connection with retaining return path information. This is described in more detail elsewhere herein.

Included in the foregoing is a description and techniques using a multihop system call in which data operations are performed by a target data storage device that may be initiated by another data storage device indirectly connected to the target data storage device through one or more other data storage devices.

The multihop system call as described herein may also be used in connection with a multipath technique that will now be described. A "multipath multihop" system call may be characterized as a remote system call in which one or more alternate communication paths may be used in connection with a multihop system call in the event of a problem, such as a hardware or software failure, with a first communication path. A communication path may be defined by making an analogy between a computer system represented as a graph. Each node in the graph may represent a data storage device, host or other computer in a computer system. These nodes are connected by edges that represent the communication connections between any two nodes, such as connections between two data storage devices, a data storage device and a host computer, and the like. A communication connection may be one of any type of communication connection, such as, for example, a LAN using an Ethernet connection, a SAN, over a fibre channel using SCSI connections, data storage device connections, such as between two data storage devices that are Symmetrix™ data storage devices using a Remote Data Facility (RDF), and the like. Thus, establishing and specifying a communication path may include, for example, determining data storage devices and selecting communication connections between them.

It should be noted that in one embodiment that includes one or more data storage devices that are Symmetrix™ data storage devices (SYMs), RDF is a facility that may be used in performing remote communications, such as between SYMs, for example, in user data transfers, such as file I/O operations, and other data transfers, as may be associated with commands, status and configuration information, and the like. RDF may be a data layer residing in each SYM. Multihop system calls may use the services of RDF to forward a remote system call to another SYM. Generally, a multihop system call may use the services of RDF to forward a request to a data storage device, or other "node". RDF may be used in facilitating data transmissions, such as between SYMs, and the target or receiving SYM may do the work in connection with executing the system call.

It should be noted that in an embodiment of the computer system using techniques described herein, data storage devices may be SYMs. Multihop system calls may be made between two SYMs using dedicated hardware connected to, or included therein. This dedicated hardware may be connected through a SAN or to another SYM, for example, using any one of a variety of communication mediums or connections known to those of ordinary skill in the art.

Figure 6:
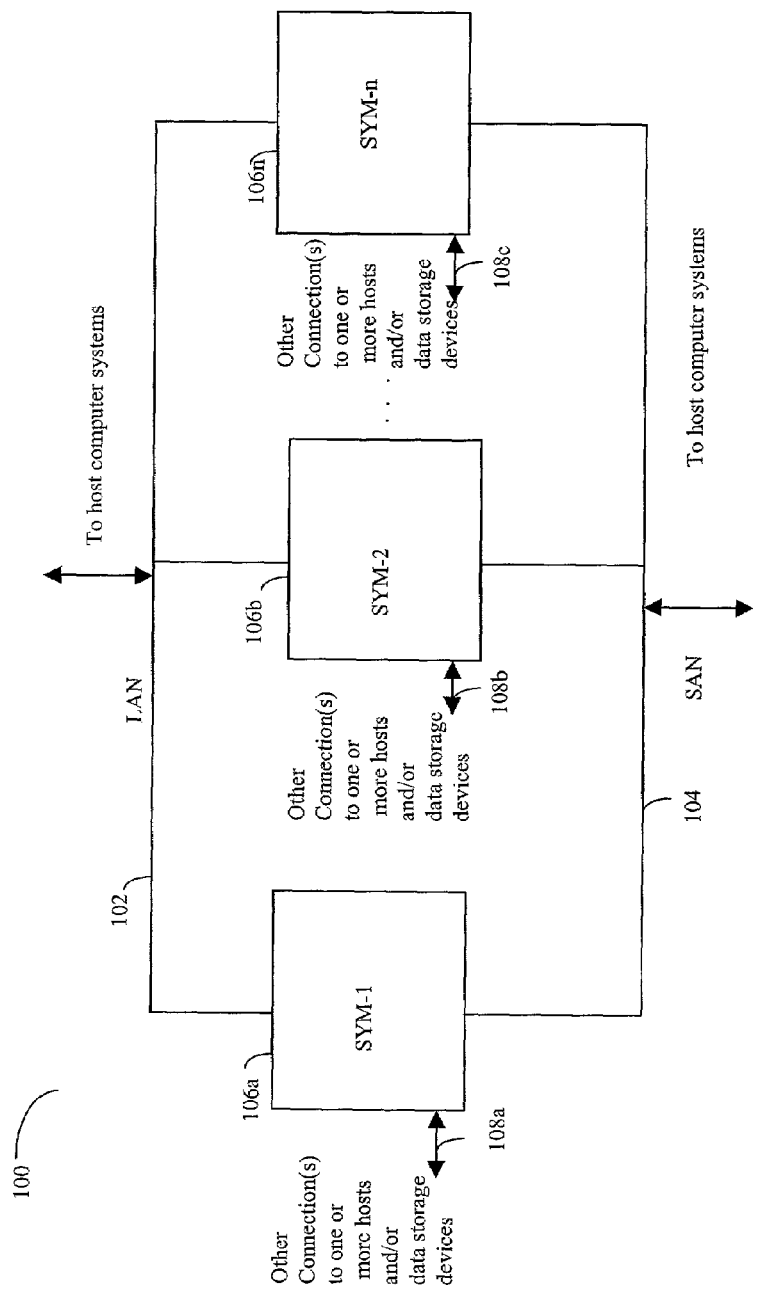
FIG. 6 is an example of an embodiment of a computer system within which a multipath multihop system call may be executed.

Referring now to FIG. 6, shown is an example of an embodiment of the computer system within which a multipath multihop system call may be made. Included in the computer system 100 is a LAN 102, a SAN 104, and data storage devices, such as Symmetrix™ data storage devices (SYMs) 106a–106n. It should be noted that although this example includes SYMs as the data storage device, other embodiments may include other types of data storage devices using the techniques described herein. Additionally, each of the SYMs 106a–106n may include one or more connections to one or more hosts and/or other data storage devices included in the computer system 100. Each of the SYMs 106a–106n may communicate with other SYMs as well as host computer systems using the SAN, the LAN, and other connections as they may be included in each device. The use of the SAN, the LAN, and other connections (such as data storage connections between SYMs), alternately or in combination, may be used to facilitate communications between data storage devices, such as between SYM 106a and SYM 106b, for example, as well as to facilitate communications between a data storage device and a host computer system, and between two host computer systems.

In one embodiment, a host computer system may communicate with a SYM, such as SYM-1 106a, using software such as the Symmetrix™ Interface Layer (SIL). Other host computer systems may use other software interfaces to communicate with other devices that may vary in accordance with each embodiment.

As described elsewhere herein, data storage devices and/or host computers and the communication connections between any two of these included in the computer system 100 may be represented in a graph. A node in the graph may correspond to a data storage device, or host computer. The nodes may be connected by edges each corresponding to a communication connection between the two nodes that are connected by the edge. For example, SYM-1 106a and SYM-2 106b may be represented as nodes in the graph. These may be connected by edges in which each edge corresponds to a communication connection, such as the LAN 102, the SAN 104, and one or more data storage connections 108a, 108b. It should be noted that connections 108a and 108b in one embodiment may be similar to those connections such as 12a–12c and 20a–20c as previously described in connection with the computer system of FIG. 1. Additionally, for example, SYM-2 may be connected to another SYM, such as SYM-n 106n by the LAN 102 and the SAN 104. However, for the connection between SYM-2 106b and the SYM-n 106n, there may not be a data device connection. In a graph representing the connections between the two nodes SYM-2 and SYM-n, there may be a representation of two edges between the nodes corresponding to each SYM-2 and SYM-n. Additionally, each of SYM-1 106a and SYM-2 106b may be represented as nodes in the same graph connected by three edges representing, respectively, the LAN connection 102, the SAN connection 104, and the data storage device connection such as represented by arrows 108a and/or 108b.

When establishing a communication path, for example, between SYM-1 106a and SYM-n 106n, any one of a variety of different existing connections may be used. In other words, there may be multiple ways of specifying a communication path between SYM-1 and SYM-n as will now be described. For example, in establishing a first communication path between SYM-1 106a and SYM-n 106n, a data storage connection between SYM-1 106a and SYM-2 106b may be used. Additionally, the LAN may be used to complete the connection between SYM-2 and SYM-n. A second communication path between SYM-1 and SYM-n may be specified by using the LAN between SYM-1 and SYM-n. The connection between SYM-1 and SYM-n as over the LAN may be a first choice in one embodiment. However, if for some reason the LAN connection on SYM-1 to SYM-n is down, such as due to hardware and/or software failures or problems, the data storage connection between SYM-1 and SYM-2 may be used in combination with the LAN connection between SYM-2 and SYM-n to form the path connecting SYM-1 with SYM-n. In performing a multihop system call from SYM-1 with SYM-n as the target device, either one of these paths may be used.

It should be noted that in the foregoing in specifying a particular path between two nodes on the graph, each path may include different intermediate nodes in the graph as well as different edges corresponding to different communication connections between any two nodes in the graph.

Figure 7:
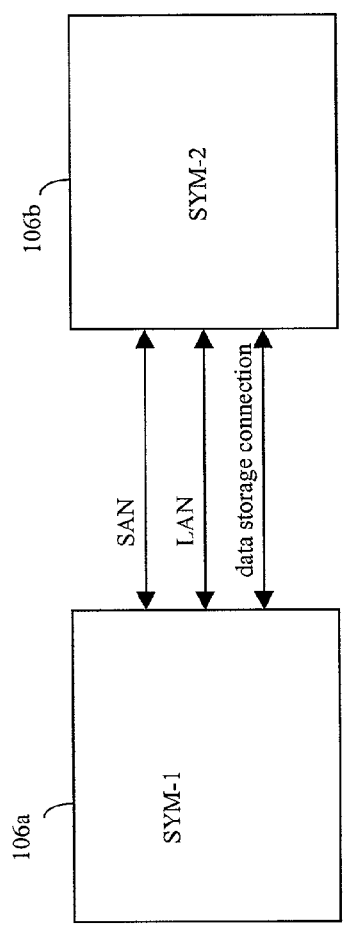
FIG. 7 is an example of a representation of communication connections as between two nodes in the computer system of FIG. 6.

Referring now to FIG. 7, shown is a representation of a logical view of the different communication connections between two SYMs as may be included in an embodiment of the computer system of FIG. 6. Shown in FIG. 7 is SYM-1 106a and SYM-2 106b. FIG. 7 shows another representation of the communication connections between SYMs 106a and 106b as also shown in the computer system 100 of FIG. 6. The communication connections in the computer system 100 that may be used in facilitating data communications and data operations between SYMs 106a and 106b are the SAN, the LAN, and the data storage connection. The representation of FIG. 7 may also be extended to other communication connections as between SYMs and/or host systems in the foregoing description of the computer system 100 of FIG. 6.

It should be noted that an embodiment may include none, one or more than one of each type of communication connection. For example, there may be three data storage connections, such as Remote Data Storage Facility (RDF) connections between two Symmetrix™ data storage devices, but no LAN or SAN connection. The number of each type, as well as the particular types, may vary in accordance with each embodiment. RDF connections are described in more detail elsewhere herein.

Figure 8:
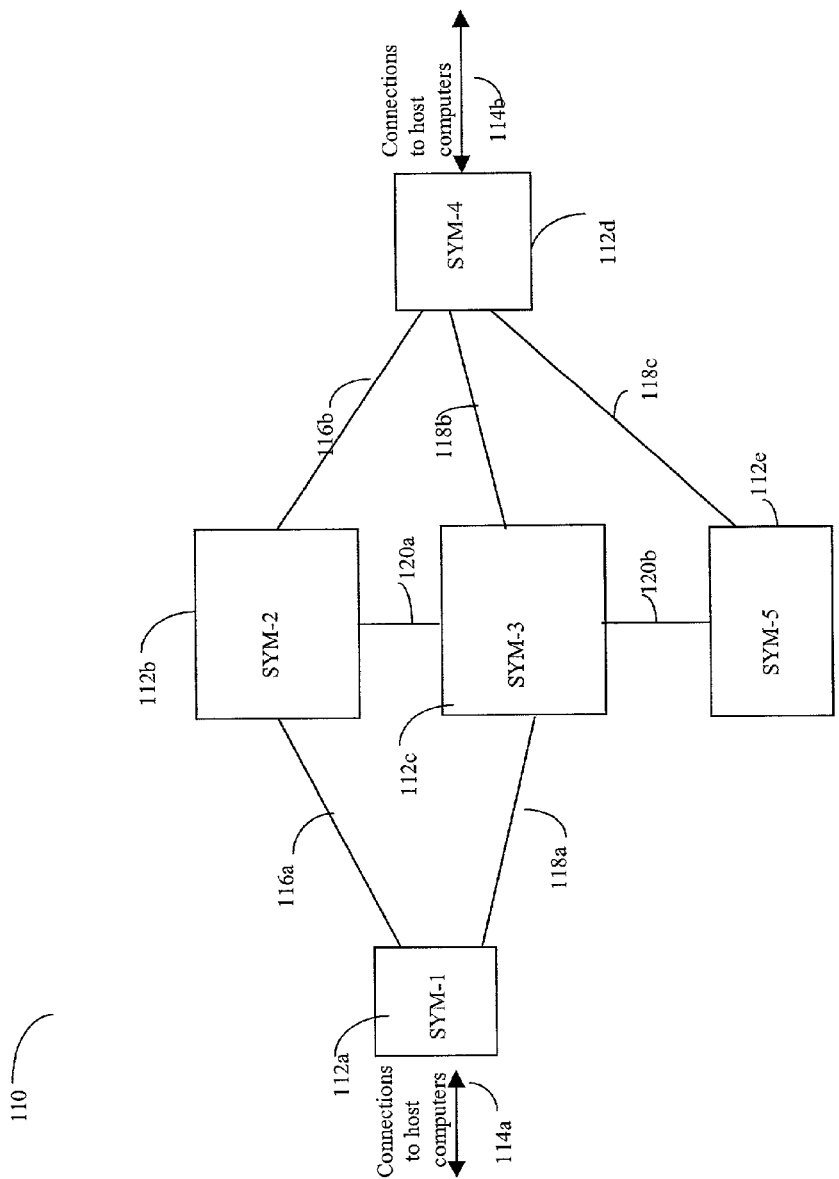
FIG. 8 is an example of another embodiment of a computer system within which a multipath multihop system call may be performed.

Referring now to FIG. 8, shown is another example of an embodiment of a computer system within which a multipath multihop system call may be performed. Shown in FIG. 8 is the computer system 110 with an arrangement of SYMs 112a–112e. SYM-112a is connected to host computers via connection 114a and SYM-4 112d is connected to host computers via connection 114b. It should be noted that connections 114a and 114b in FIG. 8 may represent one or more types of connections to host systems, such as via a LAN, or other connections, such as connection 12a previously described in connection with FIG. 1, and the like. Also shown in the computer system 110 is an arrangement of connections between the various SYMs which may be analogous to nodes in a graph that are connected by various edges such as 116a–116c, 118a–118b, and 120a–120b corresponding to various communication connections connecting the different SYMs. It should be noted in this example that the communication connections 116a–116c, 118a–118b, and 120a–120b may each represent one or more different connections between data storage devices. For example, edge 116a may correspond to the one or more connections between SYM-1 and SYM-2 such as a LAN, a SAN and a data storage connection that may exist between SYMs 112a and 112b. For the sake of simplicity, each edge represents one or more connections that may be chosen in establishing a communication path from a beginning SYM to an end or target SYM.

As will be described in more detail in following paragraphs, any one of a variety of different communication paths may be selected for sending communications, for example, between SYM 112a and SYM 112d. In forming a single communication path, multiple decisions may be made with respect to a selecting a path through an intermediate node and in selecting a communication connection when there are multiple connections between two nodes. For example, in establishing a communication path between SYMs 112a and 112d, a first decision is what SYM may serve as an intermediate node in forming the communication path. Once a particular node on the graph is determined corresponding to a particular SYM, if there is more than one type of communication connection, one communication connection is selected. For example, in forming the path between SYMs 112a and 112d, a first decision is to select an intermediate node from a particular set of candidates, which in this example is either SYM-2 112b or SYM-3 112c. Once a determination as to which SYM is the intermediate node, a decision may be made as to whether there are multiple communication connections available connecting the current data storage device, or SYM, with the selected intermediate data storage device, or SYM. For example, if SYM 112b is selected, one of the communications connections represented by edge 116a must be selected. In one embodiment, edge 116a connecting SYM 112a to SYM 112b may be one of the SAN, the LAN, or a data storage connection. One of these may be selected in forming the connection between SYM 112a and SYM 112b. This is an iterative process that may be performed in forming a communication path between a beginning node in the graph, such as SYM-1 112a, and a target or ending node in the graph corresponding to a target data storage device or SYM, such as SYM-4 112d.

Figure 9:
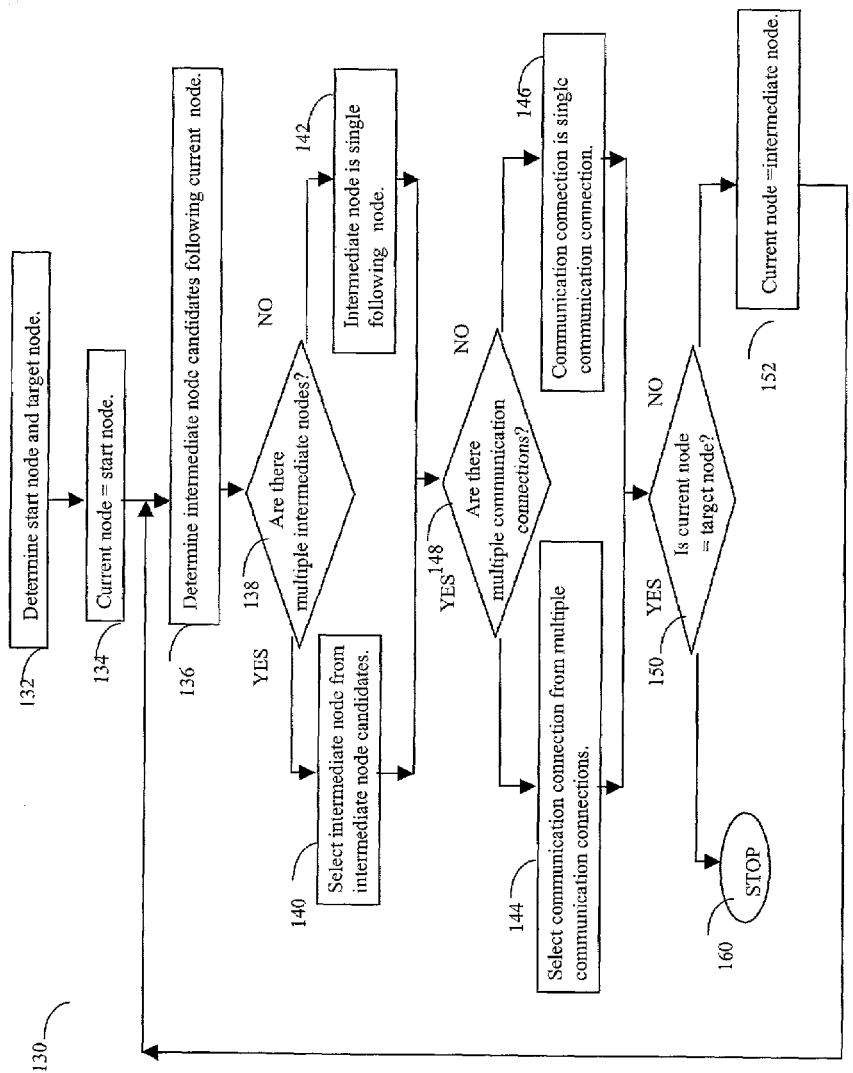
FIG. 9 is a flowchart of method steps of an embodiment for determining a communication path between a start node and target.

Referring now to FIG. 9, shown is a flowchart of an example of method steps of one embodiment for determining a communication path between a start node and a target node. Generally, the steps that will be described in connection with FIGS. 9 and 10 summarize the overall process just described in connection with FIG. 8.

At step 132, a start node and a target node in the graph are determined. The start node and the target node may represent, as previously described herein, host computers, or a storage device, for example, as described in connection with the computer system 110 of FIG. 8. Control proceeds to step 134 where a variable "current node" is assigned to be the start node. Control proceeds to step 136 where intermediate node candidates following the current node are determined. In other words, with respect to the current node, all adjacent nodes representing other host computers, storage devices and the like are determined at step 136. At step 138, a determination is made as to whether there are multiple intermediate node candidates for the current node. In other words, for the determination of candidates made at step 136, is there more than one intermediate node. If a determination is made at step 138 that there is only a single intermediate node, control proceeds to step 142 where that single intermediate node candidate is assigned to be the intermediate node. If a determination is made at step 138 that there is more than one intermediate node candidate, control proceeds to step 140 where an intermediate node is selected from the set of candidates determined at step 136. Subsequently following step 140 and 142, control proceeds to step 148 where a determination is made as to whether there are multiple communication connections as between the current node and the selected intermediate node. If there are multiple communication connections, such as a LAN, a SAN, and one or more data storage connections, control proceeds to step 144 where one of the multiple communication connections are selected. Otherwise, control proceeds to step 146 where the single communication connection is used as the single communication between the current node and the intermediate node.

Control proceeds to step 150 where a determination is made as to whether the current node is the target node. In other words, a determination is made at step 150 as to whether a complete pass has been made through the graph representing a complete communication path established between the start node and the target node. A determination at step 150 that the current node is the target node means that the communication path selection is complete and control proceeds to step 160 where processing stops. Otherwise, if the current node is not the target node signifying that a communication path is not yet complete, control proceeds to step 152 where the current node is assigned to be the intermediate node. Subsequently, control proceeds to the top of the loop at step 136 where the intermediate node candidates are determined for the current node. In other words, at step 136, all adjacent nodes for the current node are determined. The steps associated with the loop formed at the top by step 136 are performed for each new intermediate node selected until a complete communication path is formed from nodes and communication connections represented in a graph corresponding to the different data devices and host computer systems.

Figure 10:
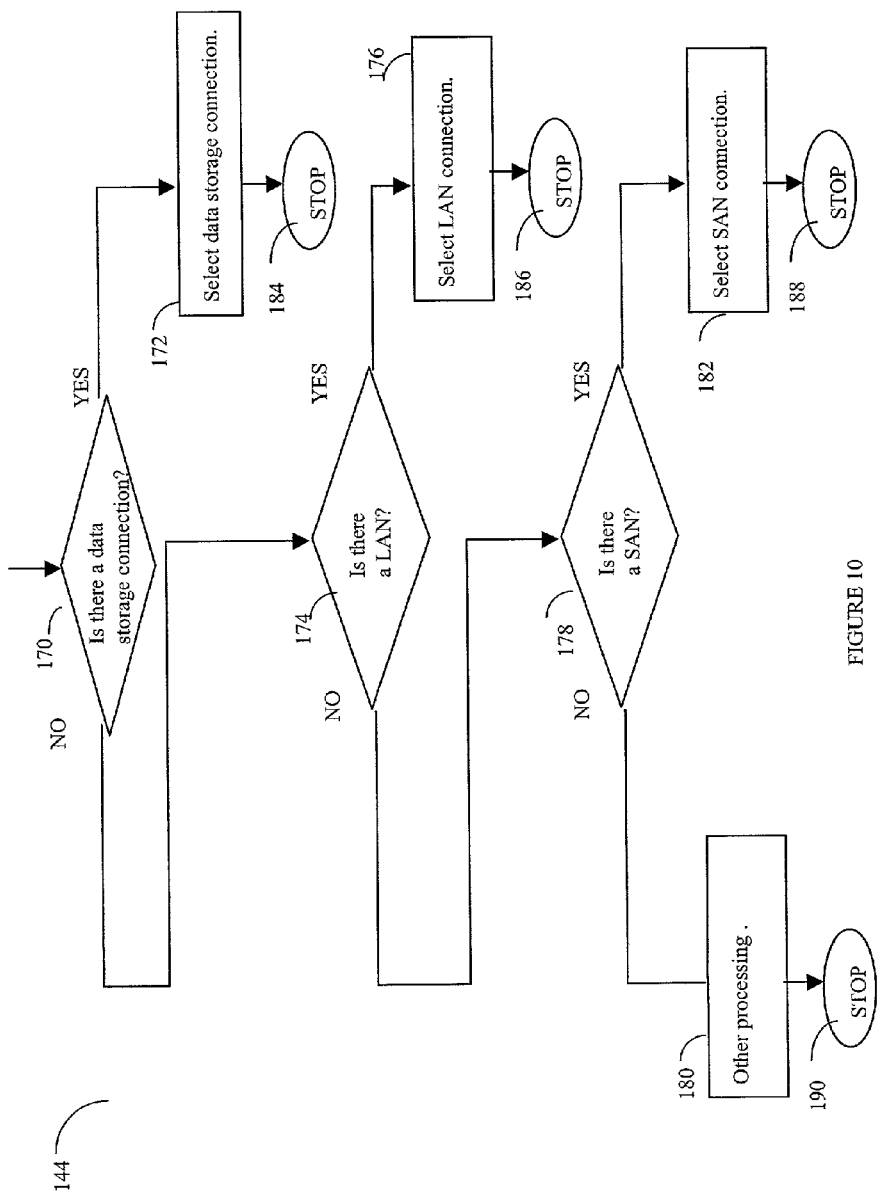
FIG. 10 is a flowchart of method steps of an embodiment for selecting a communication connection as included as a processing step in FIG. 9.

Referring now to FIG. 10, shown is a flowchart of an example of an embodiment of more detailed processing steps associated with selecting a communication connection as described in connection with flowchart 130 of FIG. 9. At step 170, a determination is made as to whether there is a data storage connection. If a determination is made that there is a data storage connection, control proceeds to step 172 where the direct connection is selected as the communication connection between the current node and the intermediate node. Processing stops with this processing step at step 184.

Otherwise, if there is no data storage connection, control proceeds to step 174 where there a determination is made as to whether there is a LAN connecting the intermediate node with the current node. If a determination is made at step 174 that there is a LAN, control proceeds to step 176 where the LAN is the selected connection. Control then proceeds to step 186 where processing stops.

Otherwise, if a determination is made at step 174 that there is no LAN, control proceeds to step 178 where a determination is made as to whether there is a SAN connection. If a determination is made at step 178 that there is a SAN connection, control proceeds to step 182 where that SAN connection is selected as a connection between the intermediate node and the current node. Control then proceeds to step 188 where processing stops.

If a determination is made at step 178 that there is no SAN connection, control proceeds to step 180 where other processing may be performed. It should be noted that whatever other processing is performed may vary with each embodiment. For example, reaching step 180 may signify that, after performing an exhaustive search amongst all the different types of connections available as represented by an edge in the graph, there is no communication connection available for use in establishing the communication path. In this instance, for example, an embodiment may choose to retry the loop or processing steps 144 of FIG. 10. Another embodiment may alternatively give an error message or perform additional processing that may vary in accordance with each embodiment.

It should also be noted that the detailed processing, such as that described in connection with processing step 144 of FIG. 10, is a selective process among the different types of communication connections available between two nodes represented in the graph. These types of communication connections may vary with each particular embodiment both in number and type as available between any two nodes represented in the graph.

What has just been described is one technique for determining communication paths between two points in a graph that correspond to, for example, host computer systems and/or data devices such as SYMs that may communication with each other in a computer system, such as the computer systems 100 and 101 also described herein.

The precedence ordering in which a particular type of available communication connection is chosen may vary in an embodiment in accordance with the two nodes or points. For example, in an embodiment, a SAN communication connection from a host to a data storage device may always be a choice over an existing LAN connection. In an embodiment that includes communication connections between data storage devices in which the data storage devices are Symmetrix™ data storage devices, a SAN or data storage connection may be the preferred communication connection. However, this may vary, for example, in accordance with the communication connections available and/or the types of data storage devices included in an embodiment.

What will now be described are variations of a multipath multihop system call that may be used in connection with a flexible distributed data storage and transmission arrangement allowing for alternate paths to be used in the event of, for example, system failures or hardware and/or software problems that may occur in a particular communication path.

The multipath multihop system call may include performing processing steps, for example, as associated with flowchart 130 of FIG. 9 and 144 of FIG. 10. In one embodiment of the multipath multihop remote system call, a general format of an instruction may be as previously described in connection with FIG. 5 using a multipath multihop opcode rather than a multihop opcode. The target connection id as specified in FIG. 5 identifying the target node may be included as part of the instruction format of the multipath multihop system call. Using this technique, a single path may be predetermined between a start or sending node and the target node that may be represented as a target connection id. In other words, the target connection id may include a complete path specification from start to end node and also intermediate nodes. An embodiment may also include a selected communication connection between each pair of nodes.

The single complete path specification may be determined prior to the call being initially made, for example, from a host computer system or a first data storage device. The complete path specification may be included in the instruction that is issued. This preselection may be performed using software and/or hardware that may reside on, and be executed by, a processor as may be included in the storage device, host computer system and the like represented by the start node. This software may implement a technique for determining a communication path between a start node and a target node, as well as any intermediate nodes, and selecting from one or more communication connections available between every pair of nodes in the communication path. This preselection may use static information reflecting the communication connections, ports, and the like available in a system.

The communication path may also be determined dynamically, for example, at the time the call is executed. An embodiment may use state or dynamic information reflecting the status of the system at the time a call being made. This information may include, for example, communication connections currently available. It should be noted that this dynamic information may differ from the static information since this dynamic information may vary with system operation. In contrast, the static information may be stored and retrieved from a network database or system table updated, for example, at system startup time. In this dynamic communication path determination, the start and end nodes of the communication path may be encoded in the target connection id for example, of the instruction format of FIG. 5. In one embodiment, the intermediate or connecting nodes and corresponding communication connections may be dynamically determined by software executing methods steps of flowchart 130. In one such embodiment, software may be included on each data storage device, for example, for determining the next intermediate node and corresponding communication connection.

In a variation of this technique, two or more ("N") communication paths between a target node and a start node may be determined, for example, by performing the method steps of flowchart 130 for determining each communication path. Information representing the plurality of communication paths may be predetermined and embedded in the multipath multihop system call target connection id. In one embodiment, the complete communication path may be included in the target connection id for each of the communication paths. Alternatively, each of the communication paths may also be dynamically determined. For example, an embodiment may encode a start node, end node, and integer quantity as to the number of communication paths to be dynamically determined between the start and end nodes. It should be noted that the "N" may be dynamically determined, for example, in accordance with a system parameter value rather than have a predetermined value as may be included in the system call and instruction format as just described.

Of these "N" communication paths that may be predetermined or dynamically determined, "M" of the "N" communication paths may be selected for simultaneous data transmissions, where "1<=M<=N". In other words, in an embodiment in which "N", N>1, communication paths are specified, the same message may be duplicated and simultaneously transmitted along each of "M" multiple communication paths. It should be noted that a value for "M" may be preselected, as for example, being encoded in the instruction format and within each call. Alternatively, "M" may have its value dynamically determined at the time of use, for example, in selecting from the "N" communication paths.

In an embodiment, the "N" communication paths may also be used as a selection list of alternate communication paths, for example, in the event that an error message or other error occurs in data transmissions between the start node and the target node. For example, a multipath multihop remote system call may be requested having three communication paths specified, either predetermined or dynamically. This multipath multihop system call may be executed by selecting a first of the three communication paths and sending data using the first of the three communication paths. At some point later, the start node may receive an error message that the multipath multihop remote system call was not successfully executed. Software at the start node may then be executed to select a second communication path from the three communication paths. The second communication path may be used to retransmit the data. Rather than wait for an error message to occur using the single path and then select an alternate communication path, "M" of the "N" communication paths may be used to simultaneously transmit the data along multiple paths.

It should be noted that "N" may have an upper bound that is the maximum of all of the specified communication paths. For example, in a multipath, multihop remote system call that includes three communication paths, a decision may be made on the start node to send the same message to two of the three communication paths rather than select a first communication path, see if that data transmission succeeds, and upon failure, try a second communication path, and so on. The number of duplicate messages to be sent may vary with each embodiment, for example, in accordance network traffic. The number of communication paths used for "M" and "N" may be tunable parameters in an embodiment, or included with each multipath multihop system call.

Alternate communication paths may also be used as a mid-way or intermediate node recovery point when a first communication path fails at an intermediate node. For example, there may be multiple communication paths that include the same intermediate node. A first communication path may be represented by "ABCD", and a second communication path by "ABD", in which letter in the string corresponds to a node in the communication path from a start node, A, to an ending or terminal node D. If a message failure or other type of error is detected when transmitting from a first node to the next subsequent node of a first communication path, a second communication path may be selected at that point in time for use in continuing transmission of the same message from the intermediate node rather than require complete retransmission, for example, from a start node. If the first communication path "ABD" is selected, an error may occur in transmission from B to D. In this instance, software and/or hardware at the intermediate node B may look for alternate recovery paths, such as by selecting the second communication path and rerouting the data dynamically upon the occurrence of the transmission error to node C and then D in accordance with the second communication path.

It should be noted that different heuristics may be used within a particular system to determine the selection of a particular communication connection or medium such as in connection with processing step 144. Additionally, other heuristics may be used in selecting a tunable parameter as to the number of times a message or communication may be transmitted simultaneously with a multipath multihop system call.

In the foregoing description, the communication paths may be predetermined, for example, prior to executing the remote multipath, multihop system call. In one embodiment, as described herein, one or more of complete communication paths may be embedded in the remote multipath multihop system call. Other embodiments may utilize other techniques in connection with predetermined communication paths. For example, a list of communication paths that are predetermined may be stored in a table previously generated by software executing on another system or processor associated with another processor in the computer system.

As also described herein a communication path may also be dynamically determined. In one such embodiment, method steps of flowchart 130 of FIG. 9 may be executed, for example, at the time a call is made using a start node and end node. The embodiment described herein may include the start and end node as part of the encoded multipath multihop system call. Other embodiments may use other techniques in communicating this information for dynamic determination of a communication path. The determination of a communication path may use any one or more of a variety of heuristics that may vary with each particular embodiment.

It should be noted that an embodiment may use a combination of the foregoing techniques in accordance with using dynamic and predetermined communication paths and associated values, such as those for "M" and "N". For example, one embodiment may use a combination of the techniques described herein, such as predetermining a single communication path that may be encoded in the instruction, and dynamically generating other communication paths as needed in accordance with dynamic values of "M" and "N". Another embodiment may predetermine some or all the nodes associated with a communication path, but dynamically select the communication connections at execution time on each node in the communication path.

In an embodiment, data associated with call information may be removed prior to forwarding to another node for one or more types of system calls, such as a multihop system call. Alternatively, an embodiment may also not remove any call information for processing any one or more types of system calls. The choice of whether to remove call information in conjunction with further forwarding a system call may vary in accordance with each embodiment, for example, such as the portion of call information removed and its associated function, whether an embodiment uses fixed or a large variable packet size, and whether return path information is included in the call information and whether this information is desired, for example, for use in connection with returning information.

The foregoing is a flexible and dynamic technique that may be used in specifing one or more alternate communication paths for data transmissions in a distributed data storage and transmission arrangement.

The foregoing techniques may be performed by a data storage device or, more generally, a data storage entity for routing a communication to a connecting entity through a communication path. In foregoing descriptions, the data storage device may function as a router of a communication, for example, by examining and determining the type of communication, and determining a communication connection and a connecting entity. The communication may be associated with a system call and/or data. The connecting entity may be any one or more of a variety of data storage entities, such as a Symmetrix™ data storage device, or a computer system. The communication connection may be, for example, a SAN, LAN, data storage connection, such as an RDF connection, and the like. It should be noted that the connecting entity and communication connection types are also described in more detail elsewhere herein.

For each path between a starting point and end point, the path may include using any one or more of the different types of communication connections. For example, in specifing a path A B C D, having starting node A, ending node D and intermediate nodes B and C, any one of the different types of communication connections between each of the two nodes may be selected in accordance with the communication connections available between each of the nodes. In one embodiment, the data storage device performs the communication connection selection between each of the two nodes in the path similar, for example, to functionality that may be provided by a router.

While the invention has been disclosed in connection with various embodiments, modifications thereon will be readily apparent to those skilled in the art. Accordingly, the spirit and scope of the invention is set forth in the following claims.

What is claimed is:

1. A method executed on a first data storage device for processing a multipath multihop system call comprising:
   determining, in accordance with an opcode, whether a data operation request is a multipath multihop system call, said data operation request including a data structure comprising said opcode as a parameter identifying one of a plurality of types of calls; and
   in response to determining that said data operation request is a multipath multihop system call:
      determining a communication path between said first data storage device and a target data storage device;
      determining a first communication connection between said first data storage device and a second data storage device included in the communication path;
      modifying said data operation request by removing a first portion of data, wherein said first portion is not removed for at least one other type of data operation request; and
      sending said data operation request to said second data storage device.

2. The method of claim 1, wherein said first communication connection is one of: a local area network, a storage area network, and a data storage connection.

3. The method of claim 1, wherein said first communication connection is a data storage connection that is a remote data storage facility connection connecting said first data storage device and said second data storage device.

4. The method of claim 1, further comprising:
   predetermining a portion of said communication path from said first data storage device to said target data storage device.

5. The method of claim 4, wherein said predetermining a portion of said communication path further comprises:
   determining a first intermediate data storage device from a plurality of data storage devices connected to said first data storage device.

6. The method of claim 5, wherein said predetermining a portion of said communication path further comprises:
   determining a first corresponding communication connection between said first data storage device and said first intermediate data storage device, wherein said first corresponding communication connection is one of a: local area network, device storage connection, and storage area network.

7. The method of claim 6, further comprising:
   dynamically determining an other portion of said communication path from said first data storage device to said target data storage device.

8. The method of claim 7, wherein said dynamically determining said other portion further comprises:
   determining a second intermediate data storage device from a plurality of data storage devices connected to said first data storage device.

9. The method of claim 8, wherein said dynamically determining said other portion further comprises:
   determining a second corresponding communication connection between said first data storage device and said second intermediate data storage device, wherein said second communication connection is one of a: local area network, device storage connection, and storage area network.

10. The method of claim 1, further comprising:
    dynamically determining a portion of said communication path from said first data storage device to said target data storage device.

11. The method of claim 10, wherein said dynamically determining said portion further comprises:
    determining an intermediate data storage device from a plurality of data storage devices connected to said first data storage device.

12. The method of claim 11, wherein said dynamically determining said portion further comprises:
    determining a corresponding communication connection between said first data storage device and said intermediate data storage device, wherein said communication connection is one of a: local area network, device storage connection, and storage area network.

13. The method of claim 1, further comprising:
    including information about said communication path in said data structure when said data operation request is a multipath multihop system call.

14. The method of claim 13, wherein said information includes data about a portion of said communication path that is predetermined.

15. The method of claim 13, wherein said information includes data about a portion of said communication path that is dynamically determined.

16. The method of claim 1, wherein said communication path is a first communication path, and the method further comprises:
    determining at least one additional communication path between said first data storage device and a target data storage device.

17. The method of claim 16, further comprising:
    determining, using said at least one additional communication path, an alternate communication path upon the occurrence of a data transmission problem.

18. The method of claim 16, further comprising:
    sending said data operation request on said first communication path and said at least one additional communication path such that said data operation request is directed to said target data storage device on a plurality of communication paths.

19. The method of claim 18, further comprising:
    dynamically determining a quantity corresponding to a number of additional communication paths used in directing said data operation request to said target data storage device.

20. The method of claim 18, wherein a quantity corresponding to a number of additional communication paths used is a modifiable parameter.

21. The method of claim 18, wherein a quantity corresponding to a number of additional communication paths used is determined in accordance with network traffic.

22. A method for processing a data operation request from a host computer system to a target data storage device comprising:
    determining a communication path from said host computer system to said target data storage device;

sending a data operation request to a first data storage device connected to said host computer system by one of a local area network and a storage area network;

determining, at said first data storage system in accordance with an opcode, whether said data operation request is a multipath multihop system call, wherein said data operation request includes a data structure comprising said opcode as a parameter identifying one of a plurality of types of calls; and in response to determining that said data operation request is a multipath multihop system call, modifying said data operation request by removing a first portion of data, wherein said first portion is not removed for at least one other type of data operation request, and forwarding said data operation request to an intermediate data storage device included in said communication path over a communication connection between said first data storage device and said intermediate data storage device.

23. The method of claim 22, wherein said communication connection is one of a storage area network, a local area network, and a device storage connection.

24. The method of claim 22, further comprising:
dynamically determining a portion of said communication path; and
including data describing said portion in said data structure.

25. The method of claim 22, further comprising:
predetermining a portion of said communication path; and
including data describing said portion in said data structure.

26. The method of claim 22, wherein said communication path is a first communication path, and the method further comprises:
determining at least one additional communication path from said host computer system to said target data storage device.

27. The method of claim 26, further comprising:
using said at least one additional communication path as an alternate communication path upon the occurrence of a transmission problem using said first communication path.

28. A computer system comprising:
a host initiating a data operation request;
at least three data storage devices, said data operation request being directed to at least one of said at least three storage devices;
a communication connection between said host and each of said at least three data storage devices, each of said communication connections including at least one of a storage area network and a local area network;
wherein each of said at least three data storage devices includes machine executable code for:
receiving and interpreting said data operation request over said communication connection that is one of a local area network and a storage area network;
determining, in accordance with an opcode, if said data operation request is a multipath multihop system call, said data operation request including a data structure with said opcode as a parameter identifying one of a plurality of types of calls; and
in response to determining that said data operation is a multipath multihop system call, modifying said data operation request by removing a first portion of data, wherein said first portion is not removed for at least one other type of data operation request, and forwarding said data operation request to an other of said at least three data storage devices.

29. The computer system of claim 28, wherein a first data storage device is connected to a second data storage device, said second data storage device being connected to a third data storage device, said first data storage device being connected to said host, said data operation request being forwarded to said first data storage device and being a multipath multihop system call directing said third data storage device to respond to said data operation request.

30. The computer system of claim 29, wherein said host further comprises machine executable code that determines a first communication path including said first, second and third data storage devices, determines a second communication path using one of a storage area network and a local area network between said host and said third data storage device, sends said data operation request to said third data storage device through said first communication path and said second communication path.

31. The computer system of claim 30, wherein said first and second communication paths are alternate communication paths.

32. The computer system of claim 30, wherein said first and second communication paths are simultaneous transmission paths.

33. A data storage device comprising:
machine executable code for determining, in accordance with an opcode, whether a data operation request is a multipath multihop system call, said data operation request including a data structure comprising said opcode as a parameter identifying one of a plurality of types of calls; and
machine executable code that, in response to determining that said data operation request is a multipath multihop system call:
determines a communication path between said data storage device and a target data storage device;
determines a first communication connection between said data storage device and a second data storage device included in said communication path;
modifies said data operation request by removing a first portion of data, wherein said first portion of data is not removed for at least one other type of data operation request; and
sends said data operation request to said second data storage device.

34. The data storage device of claim 33, wherein said first communication connection is one of: a local area network, a storage area network, and a data storage connection.

35. The data storage device of claim 33 further comprising:
machine executable code for predetermining a portion of said communication path from said data storage device to said target data storage device.

36. The data storage device of claim 35, wherein said machine executable code for predetermining said portion further includes machine executable code for:
determining a first intermediate data storage device from a plurality of data storage devices connected to said data storage device; and
determining a first corresponding communication connection between said data storage device and said first intermediate data storage device, wherein said first corresponding communication connection is one of a: local area network, device storage connection, and storage area network.

37. The data storage device of claim 33, further comprising:
  machine executable code for dynamically determining a portion of said communication path from said data storage device to said target data storage device.

38. The data storage device of claim 37, wherein said machine executable code for dynamically determining said portion further includes machine executable code for:
  determining an intermediate data storage device from a plurality of data storage devices connected to said data storage device;
  determining a corresponding communication connection between said data storage device and said intermediate data storage device, wherein said communication connection is one of a: local area network, device storage connection and storage area network.

39. The data storage device of claim 33, further comprising:
  machine executable code for including information about said communication path associated with said multipath multihop system call in said data structure.

40. The data storage device of claim 39, wherein said information includes data about a portion of said communication path that is predetermined.

41. The data storage device of claim 39, wherein said information includes data about a portion of said communication path that is dynamically determined.

42. The data storage device of claim 33, wherein said communication path is a first communication path, and the data storage device further comprises:
  machine executable code for determining at least one additional communication path between said data storage device and a target data storage device.

43. The data storage device of claim 42, further comprising:
  machine executable code for determining, using said at least one additional communication path, an alternate communication path upon occurrence of a data transmission problem.

44. The data storage device of claim 42, further comprising:
  machine executable code for sending said data operation request on said first communication path and said at least one additional communication path such that said data operation request is directed to said target data storage device on a plurality of communication paths.

45. The data storage device of claim 44, further comprising:
  machine executable code for dynamically determining a quantity corresponding to a number of additional communication paths used in directing said data operation request to said target data storage device.

46. The data storage device of claim 44, wherein a quantity corresponding to a number of additional communication paths used is a modifiable parameter.

47. The data storage device of claim 44, wherein a quantity corresponding to a number of additional communication paths used is determined in accordance with network traffic.

48. A computer readable storage medium for use in processing a data operation request from a host computer system to a target data storage device comprising:
  machine executable code for determining a communication path from said host computer system to said target data storage device;
  machine executable code for sending a data operation request to a first data storage device connected to said host computer system by one of a local area network and a storage area network;
  machine executable code for determining, at said first data storage system in accordance with an opcode, whether said data operation request is a multipath multihop system call, wherein said data operation request includes a data structure comprising said opcode as a parameter identifying one of a plurality of types of calls;
  machine executable code for modifying said data operation request by removing a first portion of data in response to determining that said data operation request is a multipath multihop system call, wherein said first portion is not removed for at least one other type of data operation request; and
  machine executable code for forwarding said data operation request to an intermediate data storage device included in said communication path over a communication connection between said first data storage device and said intermediate data storage device in response to determining that said data operation request is a multipath multihop system call.

49. The computer readable storage medium of claim 48, wherein said communication connection is one of a storage area network, a local area network, and a device storage connection.

50. The computer readable storage medium of claim 48, further comprising:
  machine executable code for dynamically determining a portion of said communication path; and
  machine executable code for including data describing said portion in said data structure.

51. The computer readable storage medium of claim 48, further comprising:
  machine executable code for predetermining a portion of said communication path; and
  machine executable code for including data describing said portion in said data structure.

52. The computer readable storage medium of claim 48, wherein said communication path is a first communication path, and the computer readable storage medium further comprises:
  machine executable code for determining at least one additional communication path from said host computer system to said target data storage device.

53. The computer readable storage medium of claim 52, further comprising:
  machine executable code for using said at least one additional communication path as an alternate communication path upon the occurrence of a transmission problem using said first communication path.

54. A method executed by a data storage entity for routing a communication, the method comprising:
  determining a type associated with the communication, said communication comprising a data structure including a first parameter identifying said type from one of a plurality of types;
  determining, at said data storage entity in accordance with said type, whether said communication is a multipath multihop system call to be performed at a target not directly connected to said data storage entity; and
  in response to determining that said communication is a multipath multihop system call:
    determining a communication connection between the data storage entity and a connecting data storage entity;

modifying said communication by removing a first portion of data, wherein said first portion is not removed for at least one other type of communication; and
sending said communication to said connecting data storage entity using said communication connection.

55. The method of claim 54, wherein said data storage entity is a data storage device.

56. The method of claim 54, wherein said plurality of types includes at least one of: data, a system call, other type of remote system call.

57. The method of claim 54, wherein said communication connection is one of: a local area network, a storage area network, a data storage connection.

58. The method of claim 57, wherein said connecting data storage entity is another data storage device.

59. The method of claim 58, further comprising:
determining a communication path between said data storage entity and an endpoint, wherein said endpoint is another data storage entity and said connecting data storage entity is included in said communication path.

60. The method of claim 59, further comprising:
determining at least one intermediate data storage device included in said communication path.

61. The method of claim 60, further comprising:
dynamically determining a portion of said communication path.

62. The method of claim 61, further comprising:
predetermining a portion of said communication path.

63. The method of claim 62, further comprising:
determining an alternate communication connection;
transmitting said communication using said alternate communication connection upon the occurrence of a data transmission problem.

64. A computer program product for routing a communication by a data storage entity comprising:
machine executable code for determining a type associated with the communication, said communication comprising a data structure including a first parameter identifying said type from one of a plurality of types;
machine executable code that determines, at said data storage entity in accordance with said type, whether said communication is a multipath multihop system call to be performed at a target not directly connected to said data storage entity; and
machine executable code that, in response to determining that said communication is a multipath multihop system call:
determines a communication connection between the data storage entity and a connecting data storage entity;
modifies said communication by removing a first portion of data, wherein said first portion is not removed for at least one other type of communication; and
sends said communication to said connecting data storage entity using said communication connection.

65. The computer program product of claim 64, wherein said data storage entity is a data storage device.

66. The computer program product of claim 64, wherein said plurality of types includes at least one of: data, a system call, other type of remote system call.

67. The computer program product of claim 64, wherein said communication connection is one of: a local area network, a storage area network, a data storage connection.

68. The computer program product of claim 67, wherein said connecting data storage entity is another data storage device.

69. The computer program product of claim 68, further comprising:
machine executable code for determining a communication path between said data storage entity and an endpoint, wherein said endpoint is another data storage entity and said connecting data storage entity is included in said communication path.

70. The computer program product of claim 69, further comprising:
machine executable code for determining at least one intermediate data storage device included in said communication path.

71. The computer program product of claim 70, further comprising: machine executable code for dynamically determining a portion of said communication path.

72. The computer program product of claim 71, further comprising:
machine executable code for predetermining a portion of said communication path.

73. The computer program product of claim 72, further comprising:
machine executable code for determining an alternate communication connection;
machine executable code for transmitting said communication using said alternate communication connection upon the occurrence of a data transmission problem.

74. The method of claim 1, wherein said plurality of types includes at least one of: system call indicating that said data request is to be performed by said first data storage device, or a remote system call indicating that said data request is to be performed by a data storage device directly connected to said first data storage device.

75. The method of claim 1, wherein said data structure includes a tag parameter identifying an issuer of said data operation request.

76. The method of claim 1, wherein said data structure includes at least one of a: flag representing an indicator associated with said data operation request, and a control parameter indicating whether a response is to be returned.

77. The method of claim 76, wherein said flag indicates at least one of: a type of error checking to be performed, and a data format type.

78. The method of claim 76, wherein said flag includes a control parameter indicating that a response to said call is to be returned, and the method further comprising:
returning information in response to said call, wherein said information returned comprises a data structure including at least one of: a return error code, data payload returned from said target in response to said call, and an inline tag specifying a sender of said call.

79. The method of claim 22, wherein said data structure includes at least one additional parameter specifying a number of communication paths wherein said data operation request is transmitting on all of said number of communication paths, or return path information.

80. The method of claim 22, wherein said first portion removed includes said opcode.

81. The computer system of claim 28, wherein said plurality of types includes at least one of: system call indicating that said data request is to be performed by said each data storage device, or a remote system call indicating that said data request is to be performed by a data storage device directly connected to said each data storage device.

82. The computer system of claim 28, wherein said data structure includes at least one additional parameter identifying an issuer of said data operation request, or return path information.

83. The data storage device of claim 33, wherein said plurality of types includes at least one of: system call indicating that said data request is to be performed by said data storage device, or a remote system call indicating that said data request is to be performed by another data storage device directly connected to said data storage device.

84. The data storage device of claim 33, wherein said data structure includes at least one additional parameter identifying an issuer of said data operation request, or return path information.

85. The computer readable storage medium of claim 48, wherein said data structure includes at least one additional parameter identifying an issuer of said data operation request, or return path information.

86. The method of claim 54, wherein said data structure includes at least one additional parameter identifying an issuer of said data operation request, or return path information.

87. The computer program product of claim 64, wherein said data structure includes at least one additional parameter identifying an issuer of said data operation request, or return path information.

88. The method of claim 54, wherein said data structure includes a second parameter identifying a plurality of communication paths when said type identifies a multipath multihop system call,and, in response to determining that said communication is a multipath multihop system call, said determining a communication connection between the data storage entity and a connecting data storage entity determines said communication connection in accordance with said plurality of communication paths included as said second parameter.

89. The computer program product of claim 64, wherein said data structure includes a second parameter identifying a plurality of communication paths when said type identifies a multipath multihop system call, and, in response to determining that said communication is a multipath multihop system call, said determining a communication connection between the data storage entity and a connecting data storage entity determines said communication connection in accordance with said plurality of communication paths included as said second parameter.

* * * * *